(12) United States Patent
Buccella (10) Patent No.: US 9,687,933 B2
(45) Date of Patent: Jun. 27, 2017

(54) CUTTING HEAD

(75) Inventor: Gianpiero Antonio Buccella, Campbellfield (AU)

(73) Assignee: PROFILE CUTTING SYSTEMS PTY LTD, Campbellfield (AU)

( * ) Notice: Subject to any disclaimer, the term of this patent is extended or adjusted under 35 U.S.C. 154(b) by 2361 days.

(21) Appl. No.: 12/482,017

(22) Filed: Jun. 10, 2009

(65) Prior Publication Data
US 2010/0314361 A1 Dec. 16, 2010

(51) Int. Cl.
*B23K 10/00* (2006.01)

(52) U.S. Cl.
CPC ............ *B23K 10/00* (2013.01); *Y10T 83/9372* (2015.04)

(58) Field of Classification Search
USPC ............ 219/121.33, 121.39, 121.44, 121.45, 219/121.58, 62, 77; 83/663
See application file for complete search history.

(56) References Cited

U.S. PATENT DOCUMENTS

| | | | |
|---|---|---|---|
| 4,855,565 A * | 8/1989 | Thomas et al. .......... | 219/121.79 |
| 5,458,668 A | 10/1995 | Shoji | |
| 6,201,207 B1 * | 3/2001 | Maruyama et al. ..... | 219/121.39 |
| 6,204,473 B1 * | 3/2001 | Legge ...................... | 219/121.67 |
| 2009/0212506 A1 | 8/2009 | Johansson | |

FOREIGN PATENT DOCUMENTS

| | | |
|---|---|---|
| CN | 2584337 | 11/2003 |
| DE | 2739200 | 3/1979 |
| GB | 2093380 | 9/1982 |
| JP | 5318106 | 12/1993 |
| KR | 100891357 | 4/2009 |

OTHER PUBLICATIONS

European Patent Office, Partial European Search Report for EP Application No. 09169638, Mar. 2, 2010, Examiner Thierry Jeggy, Munich, Germany.

* cited by examiner

*Primary Examiner* — Brian Jennison
(74) *Attorney, Agent, or Firm* — Marvin Petry; Stites & Harbison PLLC (57) ABSTRACT

A cutting head for a cutting machine, the cutting head having a holder arranged to support a cutting device, the holder being secured to an arm assembly that is adapted to be mounted to the cutting machine, a first servo motor to drive the arm assembly to effect rotational movement or swivel of the torch holder and a second servo motor to drive the arm assembly to effect tilt of the holder about a vertical axis whereby, in use, as the holder tilts and swivels to impart a bevel cut to a work piece the tip of the cutting device is held stationary.

5 Claims, 7 Drawing Sheets

CUTTING HEAD

This invention relates to a cutting head for use with cutting machines especially plasma cutters and, in particular, relates to a five axis cutting head.

BACKGROUND OF THE INVENTION

Plasma cutting is a process that is used to cut steel and other metals using a plasma torch. An inert gas is blown at high speed out of a nozzle and at the same time an electric arc is formed through that gas from the nozzle to the surface being cut turning some of that gas to plasma. The plasma is sufficiently hot to melt the metal being cut and moves sufficiently fast to blow molten metal away from the cut. Plasma cutting can be used to cut both thin and thick materials. Plasma cutting is often used to cut 60 to 80 mm thick steel but the technique has been known to cut steel up to 300 mm thick.

These days the quality of plasma cutting is enhanced by the use of computer numerical controlled (CNC) machines that robotically control the movement of the cutting torch.

There has also been an increasing demand for more sophisticated cuts that have bevelled edges and for these type of cuts it is known to use five axes cutting heads. A five axes cutting head incorporates a conventional three axis machine that mounts the cutting head assembly in such a way that it can move along an x-y plane and perpendicularly along a z axis, that is, towards and away from the work piece. In this manner the plasma jet is moved along the designated path in an x-y plane and is raised and lowered relative to the work piece. Five axes machines operate in a similar manner but also provide movement about two additional rotary axes, usually one horizontal axis and one vertical axis, so as to achieve in combination with the other axes degrees of tilt and swivel.

In CNC machines, computers are used to control the interrelationship between the movement about the five axes to provide high quality cuts taken from a drawing. Many five axes cutting heads are exceedingly complex and thus very expensive.

This invention relates to a simplified mechanism that provides the necessary control to provide a bevelled edge on a cut by a plasma cutter.

SUMMARY OF THE INVENTION

According to the present invention there is provided, a cutting head for a cutting machine, the cutting head having a holder arranged to support a cutting device, the holder being secured to an arm assembly that is adapted to be mounted to the cutting machine, a first servo motor to drive the arm assembly to effect rotational movement or swivel of the torch holder and a second servo motor to drive the arm assembly to effect tilt of the holder about a vertical axis whereby, in use, as the holder tilts and swivels to impart a bevelled cut to the work piece, the tip of the cutting device is held stationary.

According to a further aspect of the present invention there is provided, a plasma cutting machine comprising a cutting table on which a work piece can be placed, a cutting head that supports a plasma torch, the cutting head being coupled to a support gantry that is driven to displace the plasma torch horizontally in an X-Y plane and vertically along the Z axis, the plasma torch being located in a holder attached to an arm assembly, a first servo motor to impart rotational movement to the holder and a second servo motor to impart tilting of the holder about a vertical axis, the servo motors each having a feedback loop coupled to a computer, the machine defining a five axes cutting head whereby movement of the cutting head along all five axes is computer controlled.

DESCRIPTION OF THE DRAWINGS

An embodiment of the present invention will now be described by way of example only with reference to the accompanying drawings in which.

DEFINITION OF THE PREFERRED EMBODIMENT

Figure 1:
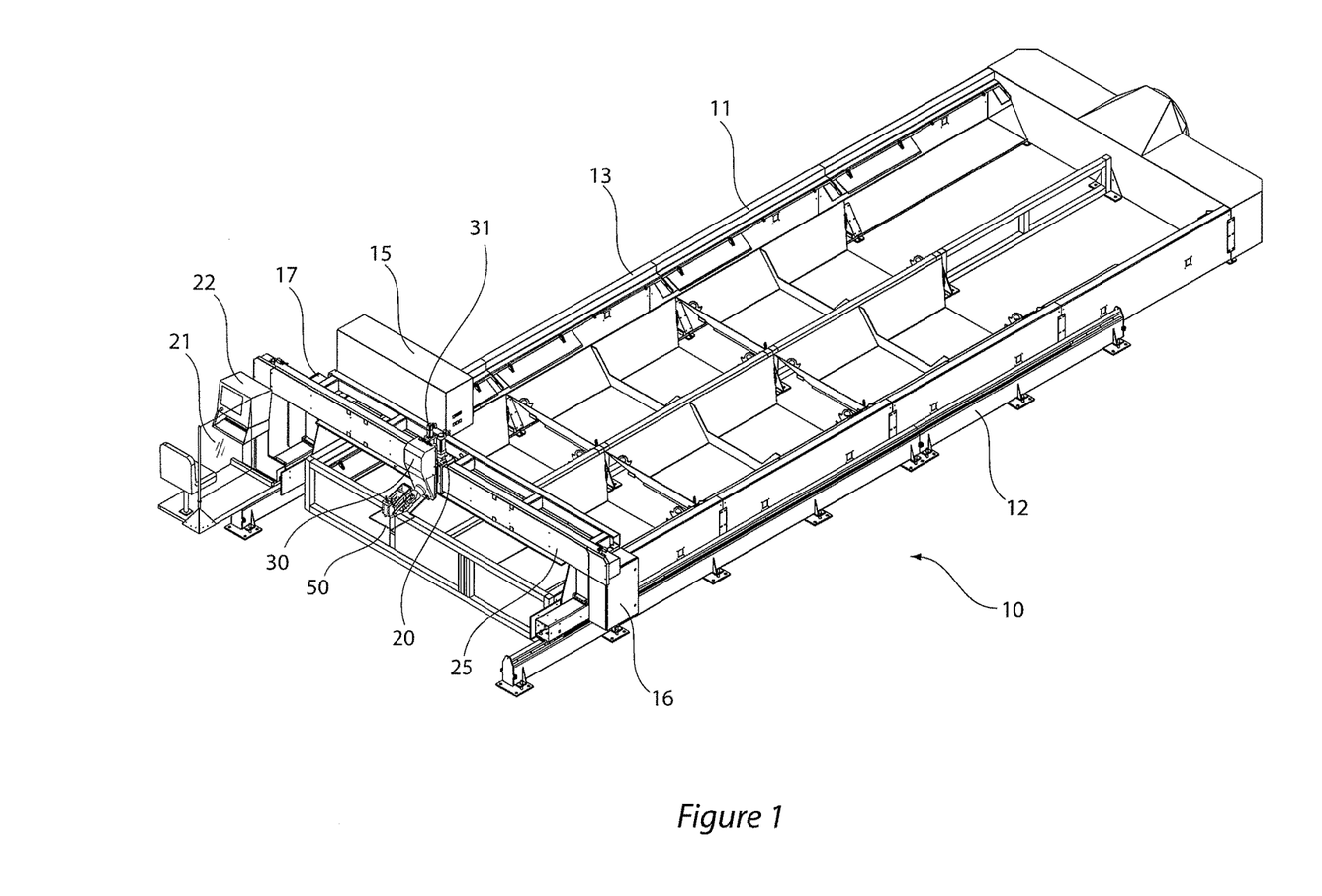
FIG. 1 is a perspective view of a plasma cutting machine.

A computer numerical controlled (CNC) plasma cutting machine 10 is illustrated in FIG. 1. The machine comprises a large rectangular bed 11 bordered on either side by longitudinally extending rails 12 and 13. The rectangular bed constitutes the underside of a long rectangular cutting platform that has spaced slats (not shown) constituting the cutting surface. An overhead gantry 15 is mounted on posts 16, 17 to extend across the bed to be longitudinally displaceable along the rails 12, 13. The overhead gantry 15 carries an elongate carriage 20 that supports a head assembly 30. The carriage 20 is mounted on a rail 25 to be driven longitudinally of the gantry 15 and across the bed. At one end of the gantry 15 there is provided a screen 21 and console 22 at which an operator can sit to control the operation of the machine. The longitudinal rails 12, 13 provide displacement of the cutting head assembly 30 in an X direction and the rail 25 on the gantry 15 provides control of movement of the cutting head in the Y direction. The cutting head 30 provides vertical movement in the Z direction.

Since the machine 10 is a plasma cutter, the cutting head 30 includes a plasma torch 50, that is a torch which includes a high speed nozzle for an inert gas and an electric arc, the combination of the inert gas at high speed and the electric arc causes the gas to turn to plasma that melts the adjacent surface of the metal which is cut by the torch.

Movement of the cutting head 30 in the X, Y and Z planes are controlled through servo motors in turn driven by a computer that allows the metal to be cut closely following a cutting path defined by a drawing.

Figure 4:
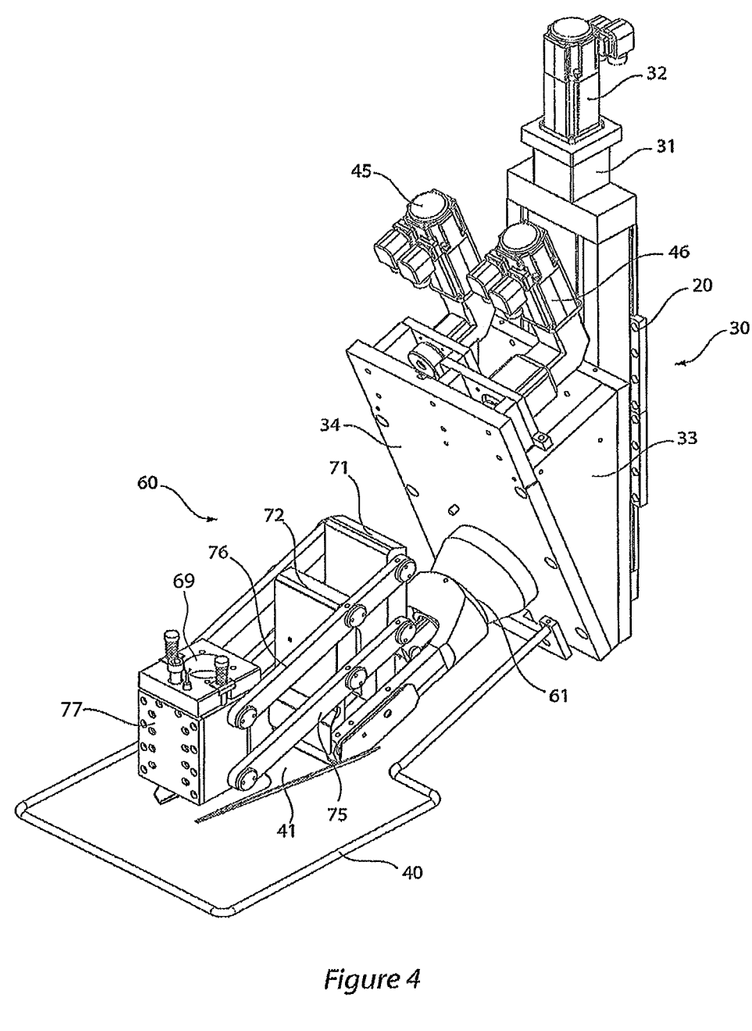
FIG. 4 is a perspective view showing the cutting head in greater detail.

The cutting head assembly 30 is shown in greater detail in FIG. 4 and comprises the carriage 20 that is secured to the overhead gantry 15 to be driven longitudinally of the gantry along the rail 25. The carriage 20 includes a downwardly extending lifting flange 31 that is coupled to the head assembly 30, a servo motor 32 is arranged to drive the flange 31 in a vertical sense thus providing the Z axis of movement for the cutting head assembly 30.

Figure 5:
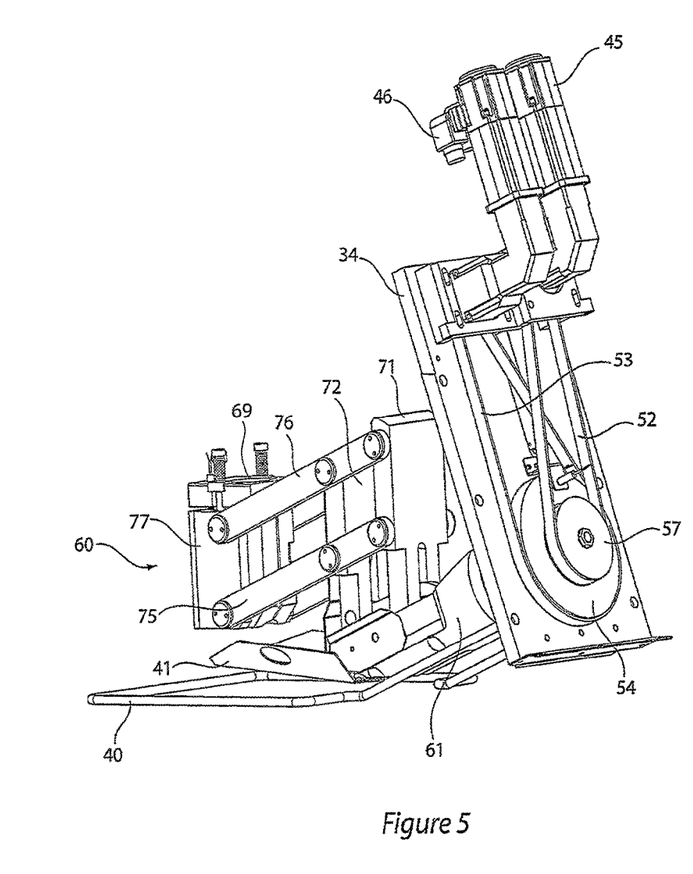
FIG. 5 is a rear perspective view of the cutting head.

The cutting head assembly 30 is shown in greater detail with reference to FIGS. 2 to 7. The lifting flange 31 is attached to an arm assembly 60 via a wedge-shaped housing 33 that has a front plate 34 that supports the arm assembly 60 that in turn supports a rectangular torch holder 69. As shown in FIGS. 4 and 5, a rectangular wire frame 40 extends forwardly of the plate 34 constituting a crash sensor and a weld splatter shield 41 extends underneath the arm assembly 60. The wedge-shaped housing 33 supports two servo motors 45, 46 and a pulley drive to effect drive to the arm assembly 60.

As shown in FIG. 5, the rear of the plate 34 supports the two servo motors 45, 46, the first 45 of which drives a smaller pulley 57 through a toothed belt 52 to provide the backward and forward drive to the arm assembly 60. The second servo motor 46 is connected via another toothed belt 53 to a larger pulley 54, coaxial with smaller pulley 57, to provide the rotational drive to the arm assembly 60.

The arm assembly 60 comprises a drive body 61 that has a central throughway 62 in which is located a link arm 63. The drive body 61 is axially rotated by the larger pulley 54 and the link arm 63 is coupled to the smaller pulley 57 through a ball nut 64, ball screw 65 and splined arm 66 so that the rotation of the small pulley 57 translates into longitudinal movement of the link arm 63.

Figure 6:
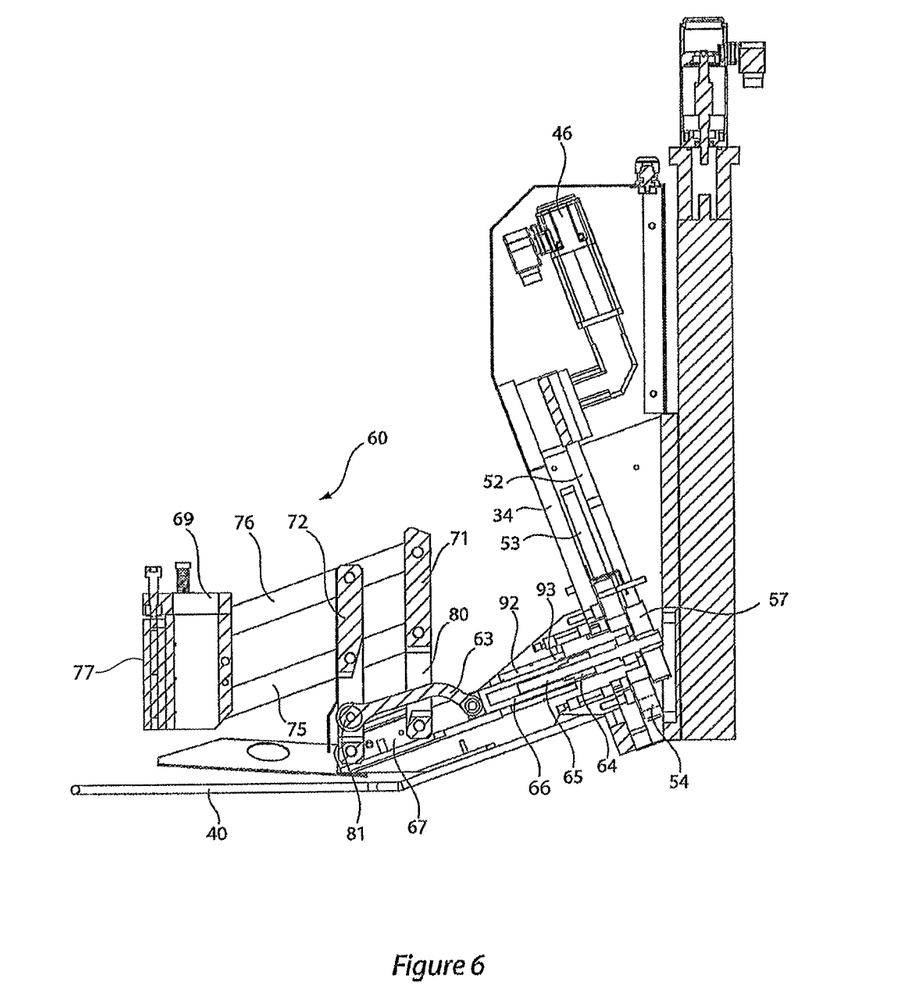
FIG. 6 is a cross-sectional view of the cutting head.
Figure 7:
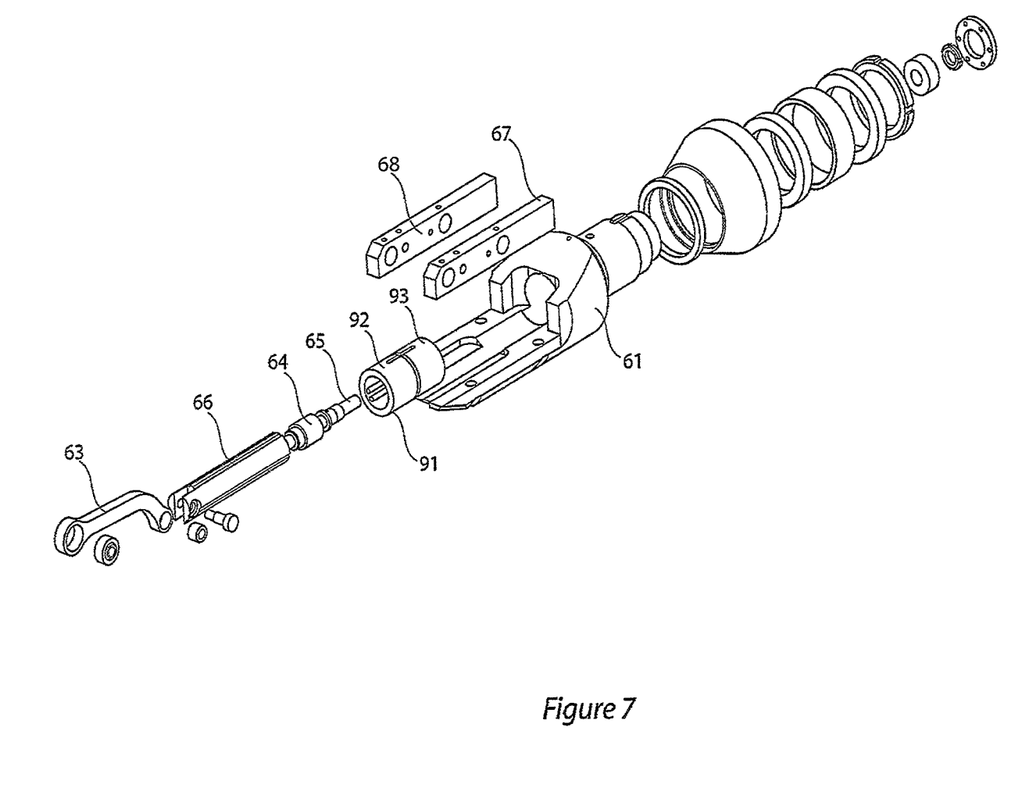
FIG. 7 is an exploded view of a drive body that forms part of the cutting head.

As shown in FIGS. 6 and 7, the ball screw 65 is externally threaded and elongate so that it is in threaded engagement within the ball nut 64 and extends into the splined arm 66. The splined arm 66 has external splines that engage within appropriate recesses 91 within linear bearings 92 and 93. The linear bearings hold the splined arm and ball nut 64 from rotation and the splined interrelationship allows the splined arm to be displaced longitudinally as the ball screw 65 rotates within the ball nut 64. In this manner, rotation of the small pulley 57 causes rotation of the ball screw 65 within the ball nut 64 to displace the splined arm 66 which is in turn pivotally coupled to the link arm 63.

Figure 2:
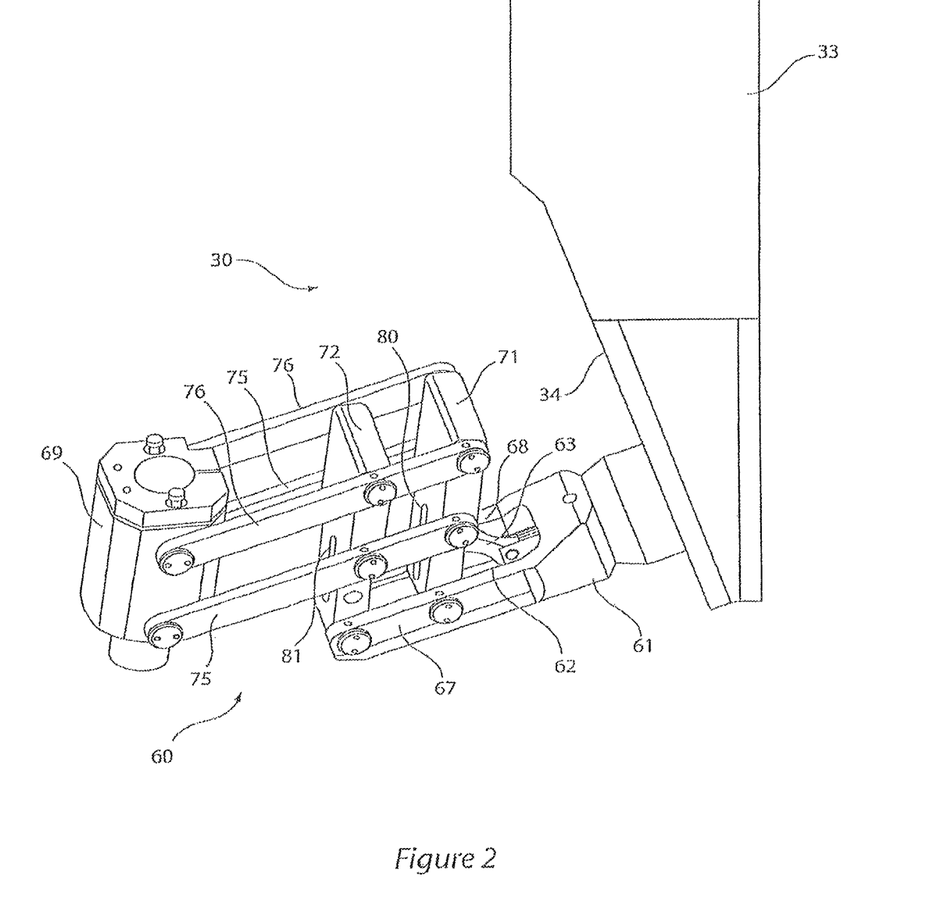
FIG. 2 is a perspective view of a cutting head of the plasma cutter.
Figure 3:
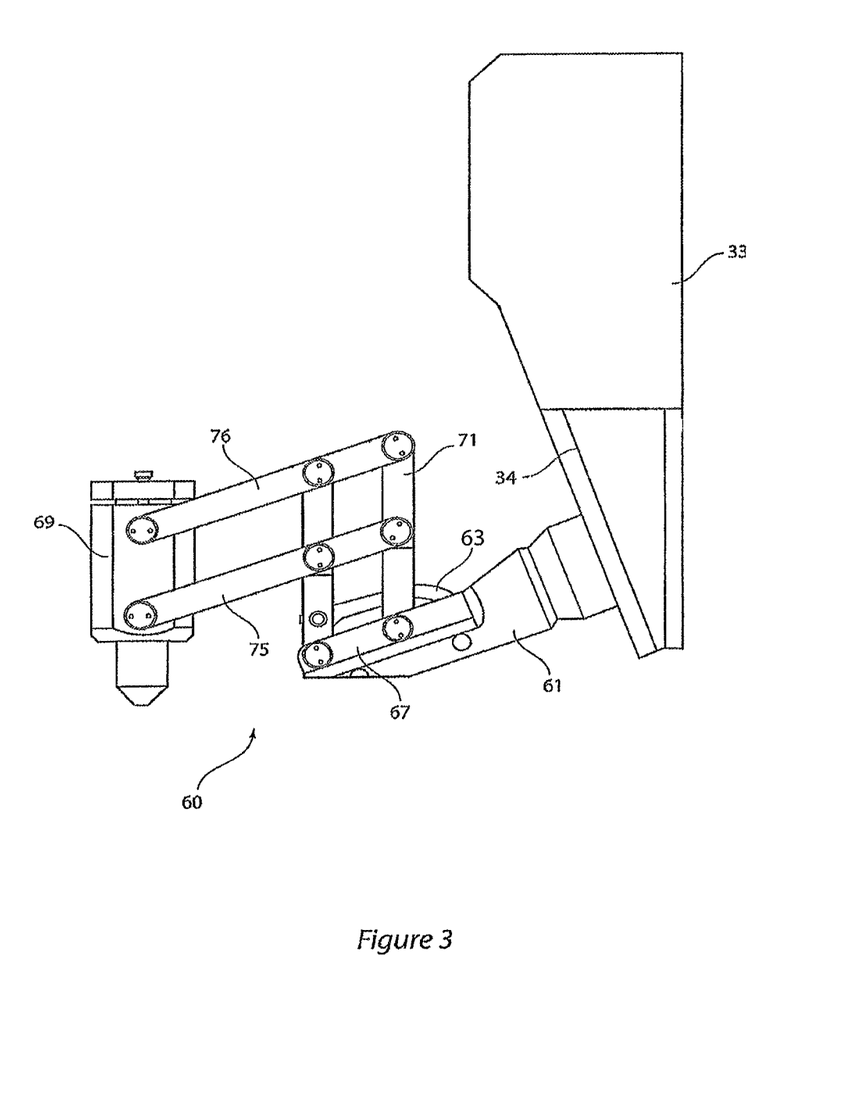
FIG. 3 is a side on view of the cutting head.

As shown in FIGS. 2 and 3, the forward end of the drive body 61 has two spaced forwardly projecting legs 67, 68 into which are pivotally secured one end of a pair of rectangular plates 71, 72 that extend mutually parallel in a vertical sense. Each plate 71, 72 has outer edges that are in turn pivotally secured to a pair of parallel extending link arms 75, 76 that extend forwardly of the plates 71, 72 as shown in FIGS. 2 and 3. The far ends of the link arms 75, 76 are in turn pivotally secured to the exterior of the rectangular casing 77 of the torch holder 69. The upstanding plates 71, 72 have a central elongate slot 80, 81. The link arm 63 extends through the slot 80 in the first plate 71 and is pivotally secured to the second plate 72 within the slot 81 in that plate. In this way, longitudinal displacement of the link arm 63 causes displacement of the parallelogram arm assembly to cause the torch holder 69 to translate a back and forth motion referred to herein as a tilt motion. Rotation of the drive body 61 causes the torch holder 69 and torch to swivel. The drive body 61 is mounted at an angle of 23° to the horizontal.

The parallelogram linkage that is particularly shown in FIG. 3 essentially has three parallel spaced vertical limbs, namely the torch holder 69 and the plates 71, 72, that are in turn pivotally secured to three "horizontal" limbs, namely the arms 75, 76 and legs 67 and 68 by horizontal, it is meant at an angle 23 degrees off the horizontal. The parallel linkage ensures only one degree of freedom of movement as both the arm rotates and the link arm cause a tilting motion. Thus as the holder 69 is displaced the arms 75, 76 remain in the plane 23 degrees off the horizontal.

The arm assembly and drive by the two servo motors introduces two axes of displacement for the cutting head, namely a first tilting axis caused by the back and forth motion of the first servo motor and the swivelling axis caused by the rotation of the drive body by the second servo motor. The back and forth tilting movement is in a plane parallel to the arm assembly and this plane swivels side to side about the longitudinal axis of the arm assembly whilst maintaining the tip of the cutting torch at the apex (cutting position).

When a plasma cutter of the kind described above is used for cutting steel plate, there is often a need to provide bevelled edges on cut steel. Bevelled edges often facilitate welding and assembly of the steel plates into an end product.

The five axes cutting head allows the steel to be cut with a bevelled edge by programming a computer to ensure that during the cutting process, a bevel cut is provided whilst holding the tip of the torch stationary. This means that the tip of the torch moves to complete the cut but remains in the same position as the torch swivels and tilts. The computer program driven by the CNC hardware ensures that the required bevel is cut to the exact profile as designated by the data from the drawing on which the cutting action is based. The use of two servo motors, both of which include feedback loops, provides close control of the tilting and swivelling movement of the torch by control of the exact movement of each motor. The constant feedback supplied from the servo motors allows the computer to frequently change and alter the position of the cutting tip to ensure a precise cut with a high quality bevelled finish. The servo motors provide exceptionally close control and the drive system, through the use of a toothed belt, ensures a high degree of control under close tolerances. The cutting head is comparatively simple in design and compact so that it does not impede the cutting operation of the plasma cutter.

Although the preferred embodiment relates to a plasma cutter, it is understood that the five axes head could be applied to other cutting machines such as water jet cutters.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

I claim:

1. A cutting head for a cutting machine, the cutting head having a holder arranged to support a cutting device, the holder being secured to an arm assembly that is adapted to be mounted to the cutting machine, the arm assembly comprising a rotatable arm that supports a parallelogram linkage coupled to the holder, the parallelogram linkage being driven by a link arm, a first servo motor to drive a screw located within a nut constrained in the arm assembly to translate rotational movement of the screw into linear movement of the link arm to effect tilt of the holder, and a second servo motor to rotate the arm of the arm assembly to effect rotational movement or swivel of the holder, the rotation of the screw and arm being effected by coaxial pulleys driven by the servo motors, whereby, in use, as the holder tilts and swivels to impart a bevel cut to a work piece the tip of the cutting device is maintained in the same position.

2. The cutting head according to claim 1, wherein the parallelogram linkage comprises three parallel-spaced vertical members that are pivotally connected to three parallel-spaced cross members, one of the vertical members being coupled to a link arm that pushes or pulls the member about a fixed axis.

3. The cutting head according to claim 2, wherein each pulley is driven by a toothed belt.

4. The cutting head according to claim 1, wherein each servo motor has a feedback loop and movement of the servo motors are computer controlled.

5. A plasma cutting machine comprising a cutting table on which a work piece can be placed, a cutting head according to claim 1 supporting a plasma torch, the cutting head being coupled to a support gantry that is driven to displace the plasma torch horizontally in an X-Y plane and vertically along the Z axis, the plasma torch being located in the holder of the cutting head, the machine defining a five axes cutting head whereby movement of the cutting head along all five axes is computer controlled.

* * * * *